United States Patent [19]

Linderman

[11] Patent Number: 4,611,280
[45] Date of Patent: Sep. 9, 1986

[54] SORTING METHOD

[75] Inventor: John P. Linderman, Berkeley Heights, N.J.

[73] Assignee: AT&T Bell Laboratories, Murray Hill, N.J.

[21] Appl. No.: 588,231

[22] Filed: Mar. 12, 1984

[51] Int. Cl.[4] ............................................. G06F 7/08
[52] U.S. Cl. .................................... 364/300; 364/200
[58] Field of Search ........................ 364/200, 900, 300

[56] References Cited

U.S. PATENT DOCUMENTS

| | | | |
|---|---|---|---|
| 3,639,728 | 2/1972 | Helfand et al. | 364/478 |
| 3,725,875 | 4/1973 | Choate et al. | 364/200 |
| 3,755,780 | 8/1973 | Sammon et al. | 340/146 |
| 3,772,685 | 11/1973 | Masi | 340/365 |
| 4,030,077 | 6/1977 | Florence et al. | 364/900 |
| 4,031,520 | 6/1977 | Rohner | 364/200 |
| 4,064,556 | 12/1977 | Edelberg et al. | 364/900 |
| 4,101,968 | 7/1978 | Florence | 364/900 |
| 4,145,753 | 3/1979 | Kashio | 364/900 |
| 4,181,948 | 1/1948 | Jackson et al. | 364/78 |
| 4,181,954 | 1/1980 | Rosenthal et al. | 364/520 |
| 4,209,845 | 6/1980 | Berger | 364/900 |
| 4,210,961 | 7/1980 | Whitlow et al. | 364/300 |
| 4,295,206 | 10/1981 | Cain et al. | 364/900 |
| 4,303,989 | 12/1981 | Membrino et al. | 364/900 |
| 4,358,824 | 11/1982 | Glickman et al. | 364/200 |
| 4,414,643 | 11/1983 | Meyer | 364/900 |
| 4,417,321 | 11/1983 | Chang et al. | 364/900 |
| 4,470,129 | 9/1984 | Disbrow et al. | 364/900 |
| 4,510,567 | 4/1985 | Chang et al. | 364/300 |

OTHER PUBLICATIONS

"An Encoding Method for Multifield Sorting and Indexing", *Communications of the ACM*-vol. 20, No. 11, Nov., 1977, M. W. Blasgen, R. G. Casey, and K. P. Eswaran, pp. 874-878.
Discussed in specification.

*Primary Examiner*—David Y. Eng
*Attorney, Agent, or Firm*—Jerry W. Herndon

[57] ABSTRACT

A sorting method for ordering information records according to the contents of one or more sort fields of the records. A sort key is the form of a character string is generated for each record according to a disclosed algorithm and the ordering of the records is performed according to a simple character-by-character sorting of the sort keys. Each of the sort fields may be of variable length and any sort field of any record may contain any number, including zero, of individual sort strings, referred to herein as sort objects.

10 Claims, 6 Drawing Figures

SORT RECORD FORMAT

FIG. 3
SORT FILE

| 1 | A AND B = A; C = D; E = 07 |
| 2 | A AND B = A; F; G = 16 |
| 3 | A AND B = A = D; |

FIG. 4
SORT KEYS

| 1 | ⟨f255⟩ A AND B ⟨d0⟩ ⟨f254⟩ D ⟨d0⟩ ⟨f254⟩ E ⟨d0⟩ ⟨f0⟩ $\overline{07}$ ⟨$\overline{d0}$⟩ ⟨f253⟩ |
| 2 | ⟨f255⟩ A AND B ⟨d0⟩ ⟨f0⟩ $\overline{16}$ ⟨$\overline{d0}$⟩ ⟨f253⟩ |
| 3 | ⟨f255⟩ A AND B ⟨d0⟩ ⟨f254⟩ D ⟨d0⟩ ⟨f253⟩ |

FIG. 6
FIELD KEY TABLE

| SORT FIELD | |
|---|---|
| 0 | FIELD KEY ⟨f255⟩ |
| 1 | FIELD KEY ⟨f254⟩ |
| ⋮ | ⋮ |
| N | FIELD KEY ⟨f255-N⟩ |

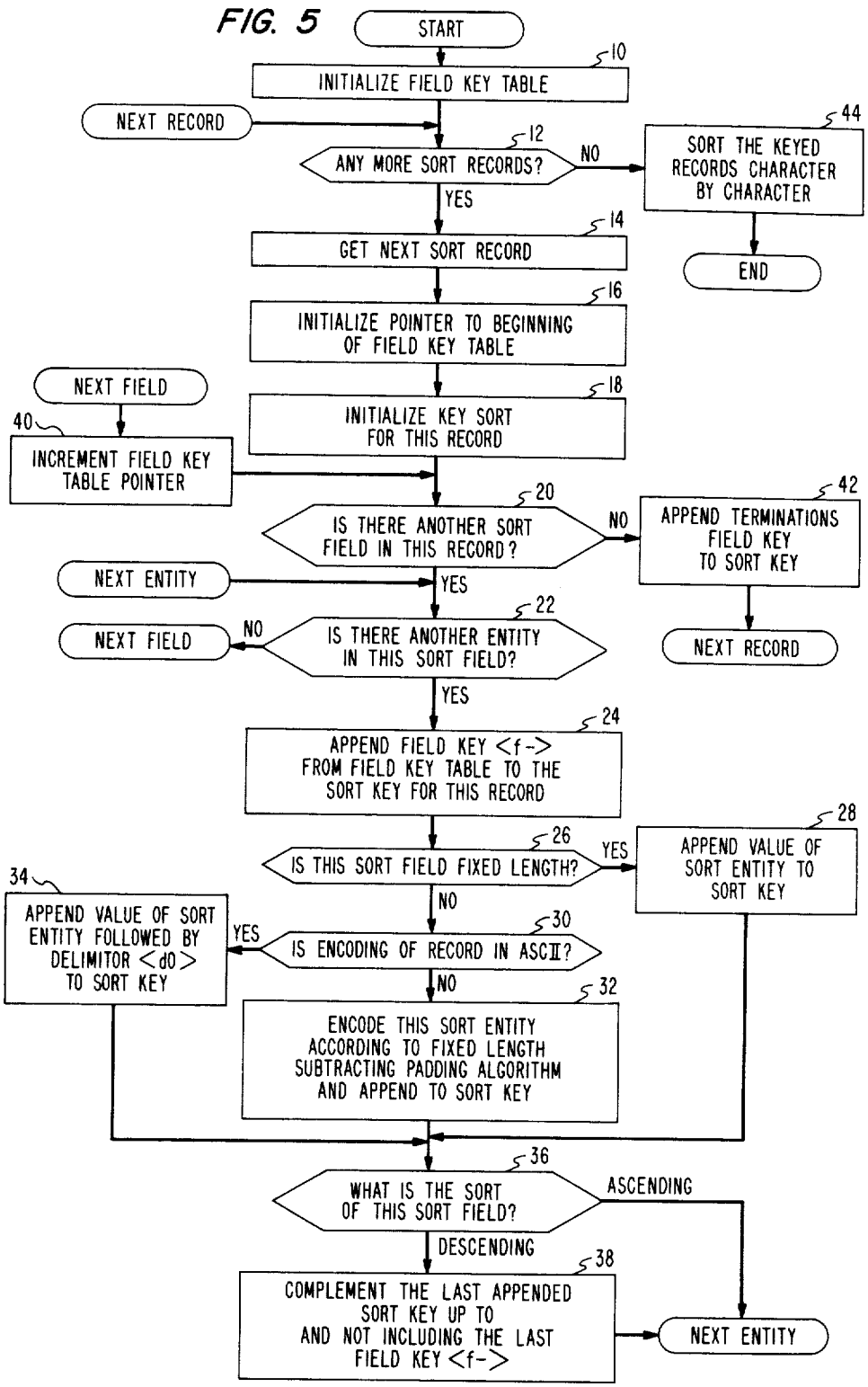

SORTING METHOD

TECHNICAL FIELD

The invention relates to sorting methods and algorithms for use in data processing systems. More specifically, the invention relates to a sorting method which is able conveniently to process records having one or more sort fields of variable length and in which any sort field may contain any number, including zero, of individual sort strings, referred to herein as sort objects.

BACKGROUND OF THE INVENTION

Numerous methods are known for sorting information records. Typically, in such methods, one or more fields of each record of a sort file are designated as sort fields and the input records are ordered by an appropriate algorithm according to the data in the sort field of the records.

Most sorting methods require the data stored in a sort field to be of fixed length. Padding characters are prefixed to the stored data as necessary to achieve this property. For example, a number in a numeric sort field might be padded with leading zeros if the representation of the number requires less than the full length of the sort field. Alphanumeric information might, on the other hand, be padded with spaces.

Techniques are also known for ordering (sorting) records according to variable length, multiple sort fields. Most such techniques are complex because of the need to account for the variable length of the sort strings in each record. One relatively simple method is described in an article entitled "An Encoding Method for Multifield Sorting and Indexing," *Communication of the ACM*, November 1977, Volume 20, Number 11, by M. W. Blasgen et al. In this method, data in the individual sort fields are encoded. The encodings for each record are concatenated to form sort keys and the records are sorted by a character-by-character comparison of the sort keys of each record. The algorithm for forming the sort keys is as follows. For each record, each sort field data string is partitioned into substrings of fixed character length L. A continuation character formed with binary 1's is inserted into the string after each partition. Fill characters "0" are appended at the end of a string to lengthen the last partition to L characters, if necessary. In this event, additional numeric characters are appended to the string specifying the number of real characters of the string that are in the last partition. The remaining sort fields of a record are encoded in a similar manner and concatenated to form the sort keys for each record. The sort keys are then compared on a character-by-character basis to perform the sort.

As an example of the Blasgen algorithm, assume that a record contains two sort fields having the respective strings "abcdef" and "xyz" and that the partition length L is 4. The concatenated sort key would then be "abcdCef002xyz03", where "abcd" forms the first partition, "C" is a continuation character, "ef" is the remaining characters of the first sort string, "00" are padding characters, "2" is the number of real characters (ef) in the last partition, xyz is the first (and only) real character string in the second sort field, "0" is a padding character and "3" is the number of real characters in the partition for the second sort string.

The Blasgen encoding algorithm preserves the lexicographic order of the original sort field data in the sort key. However, this algorithm and other known algorithms have the disadvantage that they are unable to cope with sort fields containing more than one sort object. For purposes of this discussion, a sort object is one occurrence of a coherent data entity in a sort field. For example, a sort field entitled TELEPHONE NUMBER might have none, one, or more than one telephone number in the field. Each number in the field is considered to be a sort object.

As increasing amounts of information are stored and manipulated by data processing systems, the need arises for improved sorting techniques. For example, there is an increasing need for a sorting method which simply and economically allows sorting of information records containing multiple and variable length sort fields and in which each sort field is allowed to contain variable number of sort objects.

Up to the present time, no method is known that allows this sophistication and flexibility.

SUMMARY OF THE INVENTION

An advance in the art is achieved in a method of sorting records in a data file which allows multiple sort objects to occur within the sort fields of the records. A sort key character string is generated for each record by the following steps. Each sort object in a first sort field of a record is obtained and preferred with a first prescribed field key. The prefaced sort objects are concatenated to form a partial sort key string. The partial sort key string is extended by repeating the above steps for each sort field of the record using different prescribed field keys for each sort field. When all sort fields of the record have been processed, a prescribed terminating field key is appended to complete the sort key. Sort keys are generated for all records in the file by repeating the above process. The records are then sorted by lexicographically ordering the sort keys.

Corresponding sort fields in each of the records are assigned identical field keys. For example, the first sort field of a record is assigned the same field key as the first sort field of another record in the same file. Within any given record, the field keys assigned to successive sort fields on which sorting is to be performed in ascending order, monotonically decrease in value. The field keys assigned to successive sort fields on which sorting is to be performed in descending order monotonically increase in value. The terminating field key has a value lying between the last values assigned for ascending and descending field key values.

The above arrangement is flexible with respect to the types of data that may be contained in sort fields, while at the same time preserving lexicographic order between the original sort field data and the generated sort keys. Lexicographic order is preserved even though any given sort field may be empty, or contain one or more sort objects.

The method accommodates variable length sort fields conveniently. A delimiter which is not a defined character in the encoding alphabet is appended to the end of each sort object in the sort key for variable length fields. In the case of ASCII encoded records, a suitable delimiter is the all-zero character or the complement of the all-zero character. If a suitable delimiter is not available in the applicable character encoding scheme, variable length fields may still be accommodated by encoding each sort object in the sort key with the Blasgen et al. algorithm mentioned above in addition to the use of the field and terminating keys as described herein to generate the sort keys.

BRIEF DESCRIPTION OF THE DRAWING

In the drawing,

FIG. 3 discloses an illustrative sort file having records in the format of FIG. 2;

FIG. 4 discloses illustrative sort keys generated on the records of FIG. 3 in accordance with the invention;

FIG. 5 discloses illustrative flowcharts depicting one preferred embodiment of the invention; and FIG. 6 discloses the format of a field key table. Each entry in the table corresponds to a field key associated with a specified sort field of a record.

DETAILED DESCRIPTION

Figure 1:
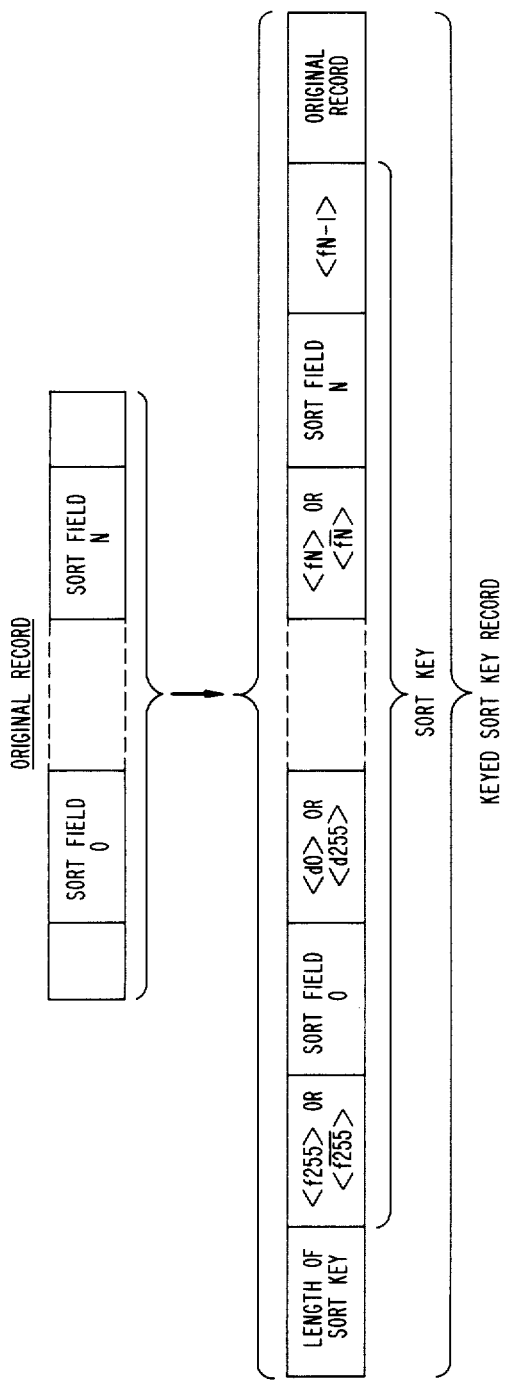
FIG. 1 discloses an illustrative format of a sort record and an illustrative format of a sort key record generated in accordance with the invention disclosed herein.

It is initially assumed for purposes of the discussion that all sort records are encoded in the ASCII format. This is not a necessary limitation of the invention. It does, however, simplify the discussion considerably.

In brief, the method of generating sort keys for the records of a sort file proceeds as follows. The first object, if any, of a sort field is prefixed with an initial field key. A delimiter may, or may not, be appended to the object depending on the character encoding method used and whether or not the field is specified to be of fixed length. The purpose of a delimiter is to guarantee that the contents of any field in a sort key cannot be a valid prefix string in a corresponding field of another record. For ASCII encoded records, it is convenient to use the "null" character 0 as a delimiter, since it cannot validly occur in a real fixed. For other types of encoding, it may be necessary to further encode field information according to the Blasgen et al. technique discussed above. This insures that no contents of a field is a valid prefix of a corresponding field of another record. In this case, no further delimiters are required.

Each additional object, if any, in the sort field is concatenated to the sort key along with the prefixed field key for this field and the appended delimiters, if necessary. When all objects of the sort field are accounted for, the remaining sort fields of the record are processed and the data strings contained therein concatenated to the sort key in a similar manner. Sort keys are generated for all records of the file in this manner. The sort keys are then sorted by a simple character-by-character comparison of the sort keys.

The field keys have the characteristic of being monotonically decreasing in value for successive sort fields of a record which are to be sorted in ascending order and monotonically increasing in value for successive fields which are to be sorted in descending order. For ASCII encoding, the field keys are arbitrarily selected to be single byte numerics beginning with the value 255 (decimal), designated by the symbol <f255> herein, for fields sorted in ascending order. According to the above characteristic, for ascending order sort fields, successive field keys for a record arbitrarily decrease in value by 1 and are designated <f254>, <f253>, et cetera for such fields. The field keys for descending order sort fields are arbitrarily selected to be the complement <fm> of the field key that would be assigned to a field if sorting were to be ascendinfg order based on the field.

Thus, the descending order field keys could begin at value 0 and increase in value (<f0>, <f1>, et cetera). The ascending field keys <f255>, <f254>, et cetera keys must, of course, not overlap with the descending field keys in any given application. The above single byte for field keys is adequate for virtually any realistic application. In special cases, however, where 256 field keys are inadequate, additional field keys can easily be generated by using multiple byte encoding, as one example.

Delimiters for the objects of fixed length sort fields are not needed in the preferred embodiment of the invention. For variable length fields and objects, the delimiter is selected to be a single byte numeric 0 (<d0>) in ASCII format.

The terminating field key in the ASCII field key encoding technique may be any numeric value whose value lies between the values of the last field key for ascending fields and the last field key for descending keys. Thus, for example, if a given application had two ascending sort fields <f255> and <f254> and two descending sort fields, the terminating field could be any key from <f2> to <f253>, inclusive.

FIG. 1 generally illustrates the translation of one sort record into a keyed sort record in the illustrative embodiment. An original sort record is assumed to have specified sort fields 0 through N. The sort key for the record begins with field key <f255> or <f0>, depending on whether records are to be sorted in ascending for descending order based on sort field 0. The contents, if any, of a first object of sort field 0 are appended to the first field key. If needed, the delimiter <d0> or <d255> is appended to this string. The sort key is extended by repeating the above process for each of the objects of the sort fields. In FIG. 1, it is assumed, for simplicity, that the last sort field N is of fixed length and, therefore, needs no delimiter. The terminating field key <fN-1> is next appended to the sort key. The original sort record is illustratively appended to the completed sort key in this embodiment. Lastly, a field containing an indication of the length of the sort record is prefixed to the sort key and original record to form the keyed sort record.

Figure 2:
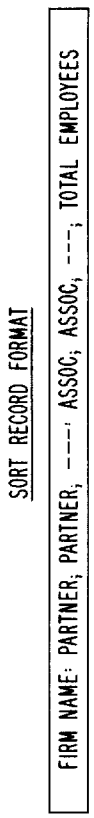
FIG. 2 discloses an illustrative sort record format used as an example herein to explain the invention.

For illustration of the invention, one format of a record in an exemplary sort file is shown in FIG. 2. Each record of the file contains data concerning a law firm. The first field of a record contains the name of a firm. Fields are separated on each record by a colon (":"). The next field contains the names of the partners of the firm. Each name in this field is an individual sort object and is separated by a semicolon (";"). The third field contains the names of associates of the firm, with each name being a sort object and separated also by a semicolon (";"). The last field contains the number of employees of the firm.

An illustrative file containing three records in the above format is shown in FIG. 3. For simplicity and to better illustrate the invention, the firm name in each of the three records is chosen to be "A and B". In the first record, the partners are assumed to be A and C. The associates are D and E. The firm has 7 employees as shown in the last field. The partners in the second firm are A, F and G and the firm has 16 employees. There are not associates in this firm. No space is allocated in the record for the empty associate fields other than the field separators "::". The last firm has a partner A associate D, and an unknown number of employees, shown also by an empty field.

The sort keys generated by the program of FIG. 5 for these records are shown in FIG. 4. The generation of these sort keys will now be described with reference to FIG. 5. Program execution begins at START in FIG. 5. Step 10 first initializes a field key table illustrated in FIG. 6. Successive words of the table correspond to successive, specified sort fields. Sort fields in any program run may be specified in any number of conventional ways. For example, an operator might specify the sort fields at run time by inputting from a terminal in response to a prompt from the computing system. In any event, the table initialization consists of inserting the appropriate field key in each word of the table. The specific example in FIG. 6 assumes that all sort fields are to be arranged in ascending order. For example, <f255> is inserted into word 0 for sort field 0; <f254> is inserted into word 1 for sort field 1, et cetera. The terminating field key is inserted into word N+1. On the other hand, if descending sort fields are specified, the appropriate field keys f<0>, f<1>, et cetera are placed in the table.

Let's assume that the file is to be sorted in ascending order of firm name, ascending order of associates and descending order of the total number of employees. Step 12 determines if any more records are left to be processed. Since we have just begun, the answer is yes. Steps 14, 16 and 18 fetch the first sort record, initialize a software pointer to the beginning of the field key table, and initialize the sort key string to be generated to "null". Step 20 determines that there is at least one more sort field remaining to be processed in this record, namely, the firm name field at this point of program execution. Step 22 determines that there is an object remaining to be processed in the sort field, namely "A and B". Step 24 appends the field key from the field key table corresponding to the sort field number currently being processed. This is <f255> at this point of the program and corresponds to the initial <f255> in the first sort key of FIG. 4. Step 26 determines if this sort field has been specified to be of fixed length. If so, no delimiter is needed. Accordingly, if this were the case, step 28 would append only the contents of the current sort field to the present sort key. Assuming that no sort field in this example is specified as fixed length, then step 30 determines if the characters in the record are encoded in the ASCII format. If not, the sort object being processed is encoded illustratively by the Blasgen et al. algorithm mentioned earlier (referred to as the fixed length substring padding algorithm in step 32), and the encoding appended to the sort key.

Since we are assuming that the sort fields are ASCII encoded, step 34 is executed, which appends the sort object "A and B" and delimiter <d0> to the sort key.

At this point, the sort key has the string value

"<f255>A and B<d0>".

Step 36 now determines the sort order of this sort field. If the order is ascending, the present state of the sort key need not be changed. However, if the order is descending, step 38 complements the last information appended to the sort key up to and not including the last field key <f255>. Complementing of the sort key string in this embodiment of the invention means complementing the values of the individual bits which form each string character.

In our example, the order of the first sort field is assumed to be ascending. Therefore, step 36 returns to the program address NEXT ENTITY. Step 22 checks for another sort object in the present sort field. Since there are no more objects in the firm name field, step 22 transfers control to program address NEXT FIELD. Step 40 at NEXT FIELD increments the field key table pointer so that if another sort field is specified for a record the proper field key is addressed in the field key table. At this point in the processing of the first record of the example file, the first object, if any, in the next sort field is processed. This is associate D in the first example record in FIG. 3. After processing in the same fashion as described above, the sort key has the state <f255>A and B<d0> <f254>D<d0> as shown in FIG. 4.

When NEXT ENTITY is next entered from steps 36 or 38, step 22 determines that the present sort field has another sort object, associate E, to be processed. Therefore, step 24 appends a field key from the field key table to the current sort key and processes the object as discussed. Note that the appended field key remains the same for all objects of the sort field, which is in this case <f254>. After processing of this sort object, the sort key has the state <f255>A and
B<d0> <f254>D<d0> <f254>E<d0>.

The final sort field, the total number of employees, is now processed. Since the order is specified to be descending on this field, step 38 complements the key information added to the sort key for this field. Step 40 increments the field key table pointer and step 42 appends the terminating field key to the sort key. The final state of the first record sort key is <f255>A and B<d0>   <f254>D<d0> <f254>E<d0> <f0>0-7<d0> <f253>. NEXT RECORD is now entered to repeat the above processing for the next record in the file.

When the sort keys have been generated for all records, the file may be sorted at step 44. This sort may be a simple left-to-right, bit-by-bit or character-by-character comparison. FIG. 4 reveals that sort key 2 orders first because of the mismatch of its second field key <f0> with the field key <f254> in each of keys 1 and 3. Key 3 orders next at the comparison of its terminating key <f253> with the third field key <f254> of the first record.

As a final example, assume that the record of FIG. 3 are to be sorted in ascending order only on the contents of the partner field. From the contents of this field in FIG. 3, record 3 should order first, followed by record 1 and then record 2. The sort keys for the unordered records 1 through 3 are, respectively, 1. <f255>A<d0> <f255>C<d0> <f254>
2.      <f255>A<d0> <f255>F<d0> <f255>-G<d0> <f254>
3. <f255>A<d0> <f254>

A left-to-right character-by-character comparison of these sort keys shows that the records do sort properly in the order 3, 1, 2.

It is to be understood that the above-described arrangement is merely illustrative of the application of the principles of the invention and that other arrangements may be devised by those skilled in the art without departing from the spirit and scope of the invention.

What is claimed is:

1. A method of sorting information records in accordance with the contents of one or more specified sort fields for each record, in which any of the specified sort fields may contain any number of sort objects and in which sort objects may vary in length, the method comprising the steps of
   A. assigning for each successive specified sort field a next one of a set of lexicographically ordered field keys,
   B. generating a sort key for each record by
      B1. initializing the sort key to a prescribed initial state,
      B2. for a first sort field in the record containing at least one sort object, appending to the present sort key the assigned field key,
      B3. appending to the present sort key a character string derived from a first sort object of the field, the resulting appendage from steps B2 and B3 having the characteristic that it is not a valid prefix of a character string derived from any other sort object in the corresponding sort field of another of the records,
      B4. repeating steps B2 and B3 for each sort object of the first sort field, repeating steps B2, B3 and B4 for each successive specified sort field,
      B5. appending to the present sort key a different terminating field key selected from the set of lexicographically ordered field keys, and
   C. ordering the records according to a lexicographic comparison of their sort keys.

2. The invention of claim 1 wherein step (A) further comprises
   assigning successive field keys monotonically decreasing in value to successive ones of the specified sort fields for which records are to be ordered in an ascending direction.

3. The invention of claim 1 wherein step (A) further comprises
   assigning successive field keys monotonically increasing in value to successive ones of the specified sort fields for which records are to be ordered in a descending direction.

4. The invention of claim 1 wherein step (A) further comprises
   assigning field keys monotonically descreasing in value to successive ones of the specified sort fields for which records are to be ordered in an ascending direction, and
   assigning field keys monotonically increasing in value to successive ones of the remaining specified sort fields.

5. The invention of claim 4 wherein step B5 further comprises the step of
   appending to the present sort key a terminating field key having a value between the values of the last assigned increasing and decreasing field keys.

6. The invention of claim 1 wherein for ASCII encoded records, step B3 further comprises the steps of
   appending the contents of the sort object to the field key for ones of the sort fields for which sorting is to be in ascending lexicographic order, and
   appending immediately after the contents of the sort object a delimiter having a value of zero.

7. The invention of claim 1 wherein for ASCII encoded records, step B3 further comprises the step of
   appending the complement of the contents of the sort object to the field key for ones of the sort fields for which sorting is to be in descending lexicographic order, and
   appending immediately after the contents of the sort object a delimiter having a value equal to the complement of the value zero.

8. The invention of claim 1 wherein the step B3 further comprises
   determining if a sort object, if any, of the sort field is constrained to be of fixed length, and, if so, appending the contents of the present sort object.

9. The invention of claim 1 wherein step B3 further comprises determining if a sort object, if any, is of fixed length, and if not,
   determining if the object is encoded in ASCII format, and, if not,
   encoding the sort object according to a prescribed algorithm, in which the resulting encoding satisfies the characteristic that it is not a valid prefix of a character string derived from any other sort object in the corresponding sort fields of another of the records.

10. The invention of claim 9 wherein the step of encoding the sort object further comprises
    partitioning the sort object into a plurality of substrings each having a prescribed length,
    inserting a fill character containing all ones between consecutive substrings,
    in the last substring, appending a sufficient number of padding characters each having a value of 0 to make the length of the last substring equal to the prescribed length, and
    appending to the last substring a character specifying the number of nonpadding characters in the last substring.

* * * * *